United States Patent
Pogorelik

(10) Patent No.: US 11,335,079 B2
(45) Date of Patent: May 17, 2022

(54) METHOD AND SYSTEM OF REFLECTION SUPPRESSION FOR IMAGE PROCESSING

(71) Applicant: Intel Corporation, Santa Clara, CA (US)

(72) Inventor: Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/912,423

(22) Filed: Mar. 5, 2018

(65) Prior Publication Data

US 2019/0042871 A1 Feb. 7, 2019

(51) Int. Cl.
| | |
|---|---|
| *G06V 10/30* | (2022.01) |
| *G06T 5/00* | (2006.01) |
| *H04N 5/232* | (2006.01) |
| *G06T 7/10* | (2017.01) |
| *G06T 7/73* | (2017.01) |
| *G06V 10/20* | (2022.01) |
| *G06V 10/26* | (2022.01) |
| *G06V 20/00* | (2022.01) |
| *G06V 40/16* | (2022.01) |

(52) U.S. Cl.
CPC ............ *G06V 10/30* (2022.01); *G06T 5/00* (2013.01); *G06T 5/003* (2013.01); *G06T 7/10* (2017.01); *G06T 7/73* (2017.01); *G06V 10/255* (2022.01); *G06V 10/273* (2022.01); *G06V 20/00* (2022.01); *G06V 40/162* (2022.01); *H04N 5/23219* (2013.01); *H04N 5/23229* (2013.01); *H04N 5/23248* (2013.01); *G06T 2207/10024* (2013.01); *G06T 2207/10028* (2013.01); *G06T 2207/20012* (2013.01)

(58) Field of Classification Search
CPC .... G06K 9/40; G06K 9/00624; G06K 9/3241; G06K 9/72; G06K 9/00771; G06K 9/00335; G06T 7/10; G06T 7/73; G06T 5/00; G06T 5/003; G06T 2207/10024; G06T 2207/10028; G06T 2207/20012; G06T 7/0016; H04N 5/23248; A61B 1/00009; A61B 1/303
See application file for complete search history.

(56) References Cited

U.S. PATENT DOCUMENTS

| | | | | |
|---|---|---|---|---|
| 8,345,921 | B1 * | 1/2013 | Frome | G06K 9/72 382/103 |
| 2008/0172261 | A1 * | 7/2008 | Albertson | G06K 9/00335 382/103 |
| 2009/0244614 | A1 * | 10/2009 | Matsuhira | G06T 7/90 358/1.15 |
| 2014/0005477 | A1 * | 1/2014 | Gupta | A61B 1/00009 600/109 |

(Continued)

OTHER PUBLICATIONS

Removal of shadows and reflections, Himabindu, 2012 https://pdfs.semanticscholar.org/6af6/645f007a8956407a632b050baad05147e6d1.pdf (Year: 2012).*

(Continued)

*Primary Examiner* — Jianxun Yang
(74) *Attorney, Agent, or Firm* — Essential Patents Group, LLP.

(57) ABSTRACT

A system, article, and method of reflection suppression for image processing by detecting undesired reflected objects in an image.

21 Claims, 9 Drawing Sheets

(56) References Cited

U.S. PATENT DOCUMENTS

| | | | | |
|---|---|---|---|---|
| 2016/0042253 A1* | 2/2016 | Sawhney | ............... | G06F 16/583 |
| | | | | 382/190 |
| 2016/0166140 A1* | 6/2016 | Lawrenson | ............ | A61B 3/107 |
| | | | | 351/208 |
| 2017/0169578 A1* | 6/2017 | Nakazawa | ................ | G06T 7/00 |

OTHER PUBLICATIONS www.kurzweilai.net/reflected-hidden-faces-in-photographs-revealed-in-pupil; 2013.

Blanz, V., "Comparison of view-based object recognition algorithms using realistic 3D models", International Conference on Artificial Neural Networks (ICANN); Springer Verlag Berlin 1996; retrieved online at: www.link.springer.com.

Moon, H., "Computational and Performance Aspects of PCA-Based Face-Recognition Algorithms", Perception; vol. 30; pp. 301-321; 2001; retrieved online at: www.journals.sagepub.co-m.

Newcombe, R. et al., "KinectFusion: Real-Time Dense Surface Mapping and Tracking", Proceedings of the 2011 10th IEEE International Symposium on Mixed and Augmented Reality (ISMAR'11), pp. 127-136, Oct. 26, 2011, IEEE Computer Society, Washington DC, USA.

Phillips, P.J., "Support Vector Machines Applied to Face Recognition", National Institute of Standards and Technology, Internal Report (NISTIR); 1998; retrieved online at: pap-ers.nips.cc/paper/1609-support-vector-machines-applied-to-face-recognition.

Plantaniotis, K. et al., "Face recognition using LDA-based algorithms", IEEE Transactions on Neural Networks; vol. 14, No. 1; pp. 195-200; 2003; retrieved online at: www.ieeeplore.ieee.org.

Swets, D. et al., "Genetic Algorithms for Object Localization in a Complex Scene", Conference Paper; Nov. 1995; retrieved at: ieeexplore.ieee.org/abstract/document/537549.

Tateno, K. et al., "Real-time and scalable incremental segmentation on dense SLAM", International Conference on Intelligent Robots and Systems (IROS), Hamburg, Germany, 2015.

\* cited by examiner

FIG. 4A  FIG. 4B  FIG. 4C
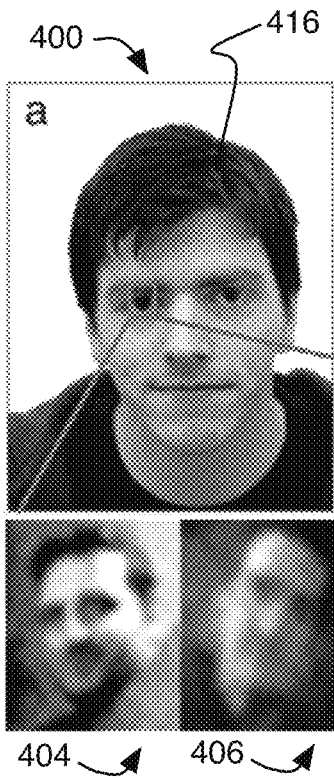 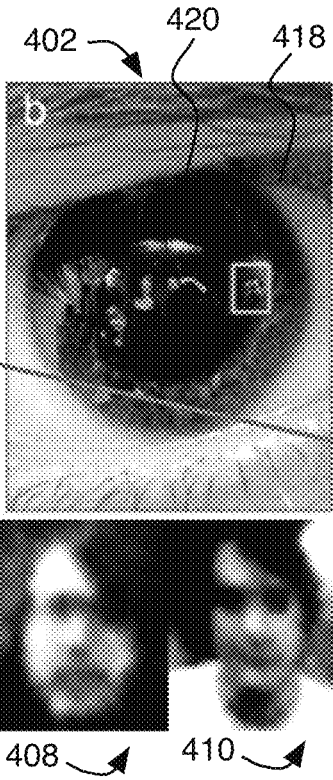 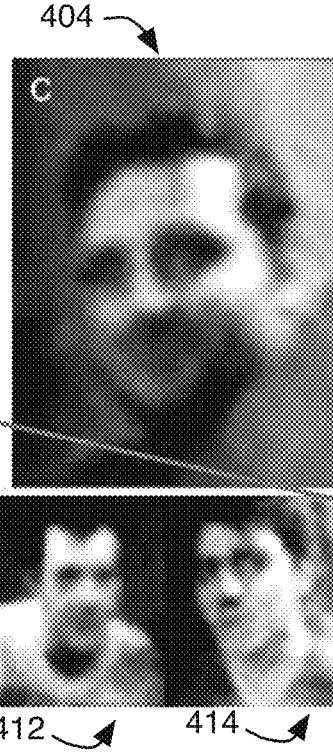
FIG. 4D  FIG. 4E  FIG. 4F  FIG. 4G  FIG. 4H  FIG. 4I
FIG. 5
OBTAIN AT LEAST ONE IMAGE OF A SCENE CAPTURED BY A CAMERA 502
AUTOMATICALLY RECOGNIZE OBJECTS IN THE IMAGE 504
AUTOMATICALLY DETERMINE WHETHER AT LEAST ONE OF THE DETECTED OBJECTS IS AN UNDESIRED OBJECT TO BE BLURRED ON THE IMAGE 506
AUTOMATICALLY BLUR AT LEAST ONE OF THE UNDESIRED OBJECTS IN THE IMAGE 508

METHOD AND SYSTEM OF REFLECTION SUPPRESSION FOR IMAGE PROCESSING

BACKGROUND

Recording video and taking pictures in public often results in the unintentional capture of reflected objects that disclose private or secret information that should have been kept confidential especially when the photographed subjects are celebrities or politicians, or relate to government or corporate secrets, or personal identification for example. The reflections may occur when capturing images of a smooth surface that tends to act like a mirror. In such cases, the identity of the person taking the picture or video as well as people standing behind the camera may be visible in such an image. In other cases, an image may capture whatever objects a person is looking at when the person is the subject of the video recording or photography, including documents with text that can be read from the person's pupils for example and when such images are enlarged. This unintentional disclosure of information from reflections in the images will become easier as the camera sensor technology improves with larger pixel resolutions and increased quality features such as super-sharp optics. Rules may be put in place either prohibiting video and photography at certain locations, such as specific rooms of a government building, or near certain people, but such strategies are often thwarted by loose enforcement of such rules, resulting in the disclosure of the confidential information once such video or photographs are shared.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 4A-4I are images provided to demonstrate identification of a person from a reflected face displayed in the pupil of a face that is the main object of an image;

FIG. 5 is a flow chart of a method of reflection suppression for image processing in accordance with the implementations herein;

DETAILED DESCRIPTION

Figure 1:
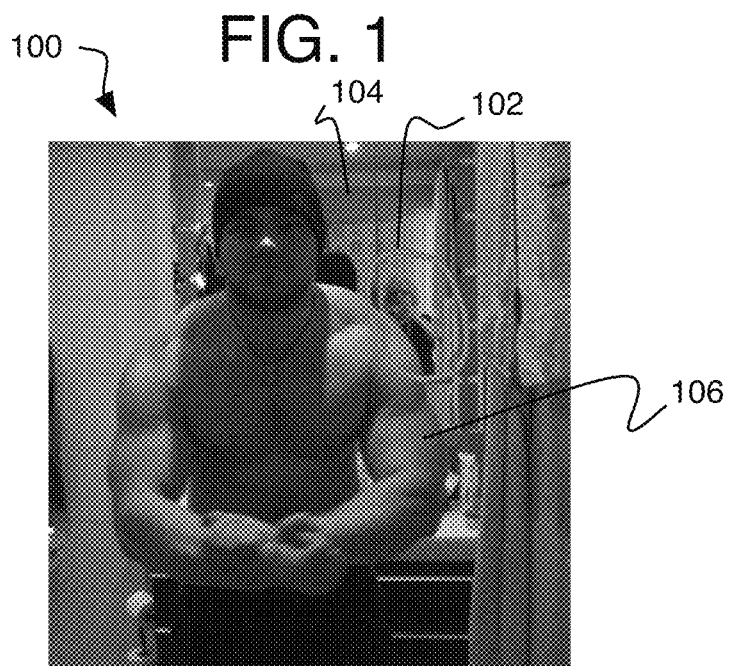
FIG. 1 is an example of an image captured with a camera and with an unintentionally captured reflected object shown in the image.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, any of which may have multiple cameras, light projectors, and/or sensors for performing object detection, depth measurement, and other tasks, and may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide reflection suppression for image processing.

Figure 2:
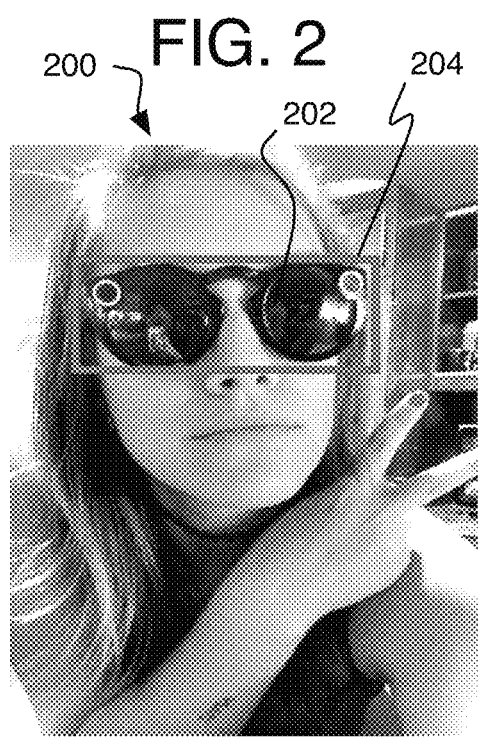
FIG. 2 is another example of an image captured with a camera and with an unintentionally captured reflected object shown in the image.
Figure 3:
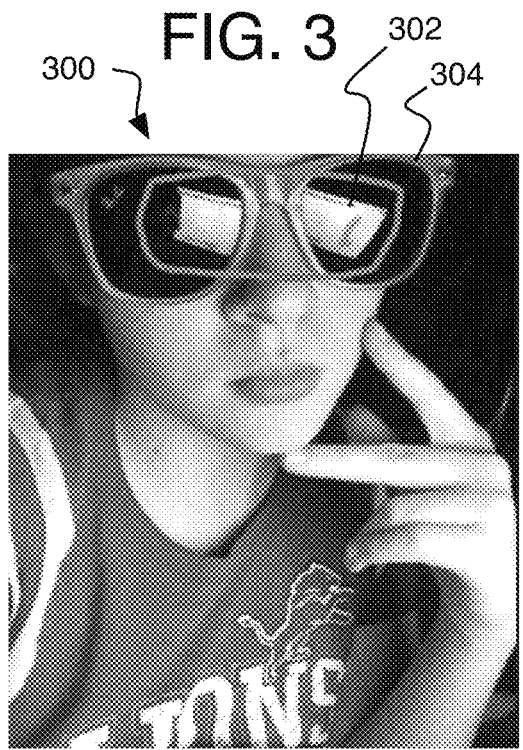
FIG. 3 is another example of an image captured with a camera and with an unintentionally captured reflected object shown in the image.

Referring to FIGS. 1-3, video and photographs may unintentionally include reflected objects that disclose private and secret information. For example, an image 100 shows the photographer 102 in a mirror 104 in the background of the image behind the person 106 that is the main subject of the image 100. Likewise, an image 200 shows an unintentional reflection 202 of a person along with a number of different objects in a reflected scene on a pair of sun glasses 204. An image 300 shows a document 302 reflected on a pair of sun glasses 304 that can be read when the document is enlarged. Herein, the object with a surface that causes the reflection is referred to as the reflective object, and the object that is being reflected, or in other words is the reflection itself, is referred to as the reflected object. Also, the terms image, frame, and picture are used interchangeably herein to refer to either an image of a video sequence or a still photo depending on the context.

Referring to FIGS. 4A-4I, the recognition of the reflected objects can be performed even though the reflected object are very small, such as a mere 1 to 10% of the image (or even less). In another example, it is possible to identify a person from a reflection on a person's eye from an image of a face. An image 400 of a person's face 416 was captured, and the eye 418 was enlarged on an image 402. The reflection of people can be seen in the pupil 420 of the eye 418, and specifically an identifiable person shown on an image 404. When test subjects were asked to identify a person from an enlargement of the reflected face and in a line-up of people (here represented by the multiple images 404 to 414), the test subjects could identify the correct person from the reflected image most of the time even when a relatively small number of pixels form the reflected image. Thus, it will be noted that sufficient detail can be obtained to actually specifically identify the person that is pictured in the reflection. See for example, http://www.kurzweilai.net/reflected-hidden-faces-in-photographs-revealed-in-pupil. Some known face recognition algorithms can identify faces as small as 16×16 pixels. When the reflected object is a document, text can be read using advanced optical character recognition (OCR) when the image data of a small reflection still provides sufficient detail to differentiate among letters.

As mentioned, known solutions such as protocols and rules that limit photography and video recording may be implemented such as prohibiting photography of certain people or in certain rooms, and having locations specifically dedicated for such image capture. These rules, however, are unreliable due to loose enforcement and errors in enforcement. As a result, sharing photos and video recordings may often unintentionally disclose confidential information.

To resolve these issues, the present method and system detects the undesired reflected objects unintentionally captured in images, and then irreversibly removes or masks those objects to avoid disclosure of secret or private information. More specifically, this is accomplished by using object recognition techniques to recognize or find the objects, and then compare the detected objects to predetermined undesired reflected objects listed on a black list forming a database (or black list database). This also may include comparing the pixel sizes and position of the detected objects, and/or using semantic scene understanding to identify detected objects as undesired reflected objects. By one form, reflective objects are identified, and then the reflective objects are scanned to determine whether any of the undesired reflected objects are located on the reflective objects rather than scanning the entire image. When the reflective objects are scanned for reflections rather than an entire image, this may reduce the computational load and processing time to perform the reflection suppression. By alternative forms, the entire image is analyzed for the undesired reflected objects. When one of the detected objects is classified as an undesired reflected object on the black list, a blurring technique may be applied to the undesired reflected object in the image in order to change the image data of the undesired object at least until it no longer indicates confidential information. For example, an image processing device can be configured to detect and scan human pupils, and then mask reflected faces (of other persons in the room) or documents found reflected in the pupils. Other details and alternatives are explained below. These techniques may minimize the risk of unintentional disclosure of confidential information (also referred to herein as private, sensitive, or secret information) without the need to enforce strict limits on the location of photography or video recording. These techniques may be performed in real time as video data is first being recorded and encoded for transmission to other devices. It is advantageous to perform the reflection suppression as a preliminary operation before encoding, or considered a part of encoding operations, since it is a pixel-based operation and can be performed while pixel image data is being prepared for encoding. These techniques also provide a hardware "level" of protection, since such pixel image data adjustment may be performed on relatively isolated hardware such as on a graphics or image processing unit so that many operating system (OS) or application level software attacks cannot remove or otherwise affect the reflection suppression. Due to the computational efficiency, lower power processors may be used thereby enabling smaller, lower power-capacity devices, such as smartphones or wearable technology like smart watches.

Referring to FIG. 5, a process 500 is provided for a method of reflection suppression for imaging processing. In the illustrated implementation, process 500 may include one or more operations, functions or actions 502 to 508 numbered evenly. By way of non-limiting example, process 500 may be described herein with reference to example image processing system 600 of FIG. 6 or system 1200 of FIG. 12, and where relevant.

Process 500 may include "obtain at least one image of a scene captured by a camera" 502. This operation may include obtaining images from single photos or from frames or images in a video sequence. This operation also may include obtaining pre-processed raw image data with RGB, YUV, or other color space values for a number of frames of a video sequence. The color and luminance values may be provided in many different additional forms such as gradients, histograms, and so forth. The pre-processing can include those techniques at least sufficient for the reflection suppression but could also include pre-processing sufficient for encoding or other image processing as well.

Process 500 may include "automatically recognize objects in the image" 504. Preliminarily, this operation may include obtaining depth data. Depth image data may be determined by a stereo camera system, such as with RGBD cameras, that captures images of the same or moving scene from multiple angles. The system may perform a number of computations to determine a 3D space for the scene in the image and the depth dimension for each point, pixel, polygon, feature, or object in the image. Otherwise, other ways to determine three dimensions from a single camera are possible such as time-of-flight, and structural or coded light technologies.

As to the object recognition, this operation can be performed in a number of different ways. By one form, all of the objects in the image are identified, and then the detected objects are analyzed to determine if any of the detected objects are reflective objects as classified in a reflective object database. The reflective objects are then scanned and object recognition algorithms may be applied again to recognize the objects on the reflective objects and determine if any reflected objects match undesired objects in a black list database listing the potential types or classes of undesired reflected objects to be removed from the image.

By another approach, the object recognition to identify all of the objects on an image is sufficient to identify both reflective and reflected objects. In this case, once the reflective objects are classified, the detected objects on, or overlapping with, the reflective objects are compared to the potential undesired reflected objects listed in the black list database without repeating the object recognition operations.

With either of these options as mentioned, one of the initial operations is to recognize all or substantially all of the objects in the image ideally sufficient to provide semantic recognition for the image such as that used in artificial intelligence (AI) or computer vision (CV) so that undesired objects to be removed from the image can be detected as explained below. This may be accomplished by a number of different object recognition algorithms. Many of these algorithms first perform a geometric segmentation using a 3D geometric model for example, and then a 3D semantic segmentation model based on the 3D geometric model. These models may be used to form geometric and/or semantic segmentation maps by one example that are used to recognize and label objects in the scene. Example algorithms that may be used are provided below with process 700. Also, label here may refer to an object receiving a single label or the object having a number of pixels, voxels, or polygons for example that each have a label on a 3D semantic model. By one approach, when a particular label is the same label for a majority or some highest voted or otherwise computed highest probability of the voxels of the detected object, the detected object is given that single semantic label as a whole. Note that this operation is concerned with the recognition or detecting of objects itself and providing the type and/or name of the object for the label. By one form, the classification of the objects as a reflective object or undesired reflected object to be removed has not occurred yet at this point.

Once the objects are identified and labeled, this operation may then include determining whether any of the detected objects should be classified as reflective objects likely to display an undesired reflected object on its surface. Such reflective objects may include objects with smooth surfaces that act like a mirror. This may include objects such as eye glasses, mirrors, objects with glass panels such as building facades, windows, doors, and furniture such as glass tables, display screens such as smartphones, computer monitors, or televisions, wrist watches, and so forth. The reflective objects, however, also may be any object with a smooth surface that causes a reflection and are not limited to objects made of glass, such as water surfaces, walls, vehicle bodies, and so forth. A reflective object database may provide a classification for each such class, and optionally may provide feature characteristics for the class, such as a shape and so forth.

By one form, the system may determine whether to classify a detected object as a reflective object from the reflective database by performing semantic comparisons. When the semantic label of the detected object corresponds to one of the reflective object classes, the detected object is provided that class or label. For example, a semantic label may be sun glasses (or more particularly a code for sun glasses). The database may be setup so that the classes match the semantic labels so that for this example there may be a class (or code) for sun glasses in the reflective object database. This includes providing both the semantic labels and classes of the database with the same tree structures. For example, a human face may be the base for the tree and a specific person is one on the branches, and both the models and the database may have the same labels for the tree. By some forms, the classes and sub-classes of the labels may not be exactly the same and nevertheless may have predetermined correspondences to be able to match a semantic label of a detected object to a classification tree. Thus, the semantic label may only have faces generally, even though the classes in the database also have, just have, particular people.

By an alternative approach, the 3D geometric and semantic models, when present, for each particular class are saved in the database, and the models of the detected objects are compared to the models in the database to determine if there is a sufficiently close match to recognize and classify the detected object as one of the reflective objects. This may be performed by using deep learning (or neural networks) to classify the detected objects, where the input is the pixel locations of points and/or features on the detected models, and the output is a classification of a reflective object.

Then, as part of the operation to automatically recognize objects in the image, process 500 may include "automatically determine whether at least one of the detected objects is an undesired object to be blurred on the image" 506. Continuing the example when classified reflective objects are used, the reflective objects are analyzed to determine whether any detected objects exist on one of the reflective objects that can be classified as one of the undesired reflected objects from the black list database. Classified here refers to semantic comparisons to find a semantic equality, the use of deep learning methods, or other methods as described below. By one form, only the reflective objects are analyzed to find reflected objects rather than an entire image thereby reducing the computational load and time to perform the reflection suppression.

As mentioned, by one option, the object recognition performed for the reflective objects also resulted in sufficient geometric and semantic object recognition for the reflected objects as well so that no new object recognition needs to be applied to the image. In this case, the system simply finds the already identified detected objects on the reflected objects, and proceeds with semantic comparisons to determine whether the detected objects should be classified as undesired reflected objects as listed in the black list database. As described below, this option still may be performed with multiple object recognition algorithms being applied to better ensure accurate results.

By other approaches, however, a separate object recognition operation is applied again after reflective objects are classified, but this time only to the areas of the image with a reflective object to determine if there are detectable and recognizable objects on the reflective objects. This may include applying similar object recognition algorithms as described above for finding the reflective objects. Thus, these algorithms also may include geometric segmentation, and then a semantic segmentation to provide labels for the detected objects on or overlapping the reflective objects. Particular example algorithms are mentioned below with process 700.

When detected objects are found on reflective objects, or more specifically found within or crossing the reflective object boundaries, either from the original object recognition when establishing the reflective objects or from a second object recognition operation specifically to find and label detected objects on the reflective objects, the system may now apply operations to determine whether the detected objects on the reflective objects should be classified as undesired reflected objects to be removed from the image. By one form, this is accomplished by semantically comparing the detected objects to the black list database of classifications of undesired reflected object, and in one form, each corresponding to one or more semantic labels of the object recognition models.

The classes in the black list database may include objects such as people's faces and documents, often detectable as a very bright rectangle even when very small. Also, the classes may include different levels of detail. Thus, this may include faces generally and/or a face of a specific person. Likewise, this also may generally include any object identified as a document, or alternatively, or additionally, may include documents with certain words on the document when optical character recognition (OCR) is available such as "top secret", to name a few examples. These different levels of detail for classes and related sub-classes may be organized into a tree structure.

Thus, the object recognition mentioned above may be performed at a detail level that matches the level of detail in the databases. If the databases only classify human faces generally, then that may be all that is accomplished here during object recognition. By other forms, the semantic object recognition may be able to recognize a number of detail levels such as human faces and faces of specific people that match the classifications in the black list database for example. By yet another form, the semantic comparison uses predetermined correspondences so that the semantic labels and classifications do not need to match exactly to find a classification as with the reflective database described above. Thus, even though the semantic label is simply a human face, it will still match to a face tree with specific face classifications in the black list database.

By yet another alternative, the object recognition performed during reflective object recognition may determine a "general" class for objects on the reflective objects, the base of the tree structures for example, such as human faces. Then, later during the object recognition of the reflected objects, the object recognition now may perform a more limited second object recognition for the semantic segmentation labels such as only recognizing face related objects.

To classify a detected object on or overlapping a reflective object as one of the undesired reflected objects from the black list database, and as with the classifying of detected objects as reflective objects, a semantic comparison may be performed to match the semantic labels established during object recognition to a classification in the black list database thereby providing an undesired reflected object class to a detected object. Thus, for example, object recognition described above may classify a detected object to a human face, and the black list may include the class human face, so that the detected object is then classified as a human face, and is likely to be an undesired reflected object to be removed. If no class from the black list matches the class (or label) of the detected object, the detected object is maintained on the image. This may be performed on multiple levels, as mentioned above, in one form by using tree structures in the black list database that may or may not be matched in the semantic labeling. As mentioned, applications can be applied that determine the correct tree to match to a semantic label when the structures of the semantic labels and classes of the black list are not the same. By this example, a match is still considered a successful match when a specific semantic label is matched to a generic or general class in the database label (specific face is just matched to class human face, for example) or the opposite way when the semantic label is generic but the tree, or here class category or type, is more specific (such as a semantic label of documents with "top secret" stated on the document but the black list database merely has a category for "document").

By another alternative, as with the reflective object recognition, a deep learning AI (or CV) algorithm may be applied that provides one or more neural networks that receives data of the shape of the detected object, such as pixel locations and voxel labels forming the features on a model of the detected object in 3D, and then compares this model of the detected object to saved models each relating to one of the classifications in the black list. Such algorithm then may output a highest probability classification of the black list. Otherwise, other feature matching algorithms could be used also. Many variations are possible.

Whether the semantic comparisons or more sophisticated deep learning algorithms are applied to determine the black list class for a detected object, further analysis may be applied to ensure that a detected object now classified as one of the classes from the black list is in fact a reflected object that should be removed. For instance, this may involve comparing the pixel size of the classified detected object to the size of other objects in the image. Thus, when the size of the classified object is very small compared to other objects in the image, it is likely to be a reflection to be removed. By one form, this may occur when the detected classified object is less than about 1% of the image size or one of the objects in the image, such as the largest object in the image or the reflective object upon which the detected object is located. By another form, less than about 10% may be used, or it may change depending on the classification of the object. By yet another form, certain pixel sizes are monitored rather than, or in addition to, some percentage, such as about 16×16 pixels or less may be considered sufficiently small to be likely to be a reflected object depending on the total screen size discussed below, and this pixel size criteria may be optimized by experimentation. Relying on pixel size also should be adequate when a classified detected object has already been found to be located on a surface of a reflective object during the object recognition operations, and the size comparison is between the classified reflected detected object and its reflective object upon which it is located.

However, size alone may not be sufficient when comparing the classified detected object to other objects that are not the reflective object, and may include very small objects that are far away in the background of the image that are not reflected objects. Thus, in this case, size may be analyzed in conjunction with the 3D position of the classified object relative to other objects on the image. When two objects of extremely different sizes appear to be at the same depth, this is likely to indicate that the smaller object is on a surface of a larger object, and is therefore an undesired reflected object to be removed from the image.

By a further strategy, semantic segmentation analysis may be used to develop a scene understanding. Thus, when the system is able to identify an object as a window, and a small face is identified and is located on the window, the system will understand that this does not make sense and the face is most likely a reflection in the window, and is therefore an undesired reflected object to be removed by blurring. This operation also may be used in conjunction with the size and position analysis mentioned above.

It will be appreciated that other orders of analysis may be used other than that presented above, such as first analyzing size and position, and then semantic scene understanding analysis when used, before matching semantic labels to classifications in the black list database, and so forth. Thus, when the size, position, and/or semantic understanding criteria is not satisfied, then those objects are dropped and need not be matched to the black list. Any order may be used that is most efficient.

By another alternative, a brute force mode also may be used that limits the likelihood that an undesired reflected object is on the image. This may be accomplished by identifying the reflective objects as mentioned above, and then blurring the reflective surfaces of those objects no matter what color or brightness patterns or pictures are on those surfaces, thereby effectively removing any reflected object that may have been displayed on those surfaces. This requires recognition of the reflective objects but avoids the use of a black list of undesired reflected objects to be blurred.

By yet another alternative, a pure black-list mode might be used where any detected object that is classified as one of the undesired reflected detected objects no matter where it resides on the image may be blurred, and depending on a certain characteristic alone such as the pixel size of the object compared to the largest object on the image. Thus, when a photo of a person is captured, those detected objects in the background that are less than about 1% in size than the main object or person in the photo, or other desired size difference, are blurred as well. In this case, the system may omit first scanning the image for the reflective objects.

Once the undesired reflected objects are identified, a blur list or blur map may be maintained that indicates the locations, size, and shape of the undesired objects on the image, and where a mask to change the image data should be placed to remove or blur the undesired objects.

Process 500 may include "automatically blurring at least one of the undesired objects in the image" 508. Here, the undesired reflected detected objects from the blur list or map of undesired reflected objects may be covered with a mask to remove or blur the object so that it cannot be recognized. This operation, or in other words the mask itself, has image data that is scrambled or changed sufficiently to hide the undesired reflected object. Blur or blurring here is used in the general sense to include changing the image data of the undesired object in a way to avoid disclosure of confidential information. Thus, blurring here may include changing of the undesired object to a single color such as black found in the undesired object, or color matching a nearby color, in addition to including changing the colors by moving multiple colors of the undesired object either randomly or by a predetermined pattern, or by taking colors nearby the undesired object and placing them in a random or predetermined pattern in the area of the image forming the undesired object. By one form, the blurring is irreversible, and also may be performed as a preliminary operation to encoding the image data such that this operation may be considered part of the encoding process for more efficient processing.

Figure 6:
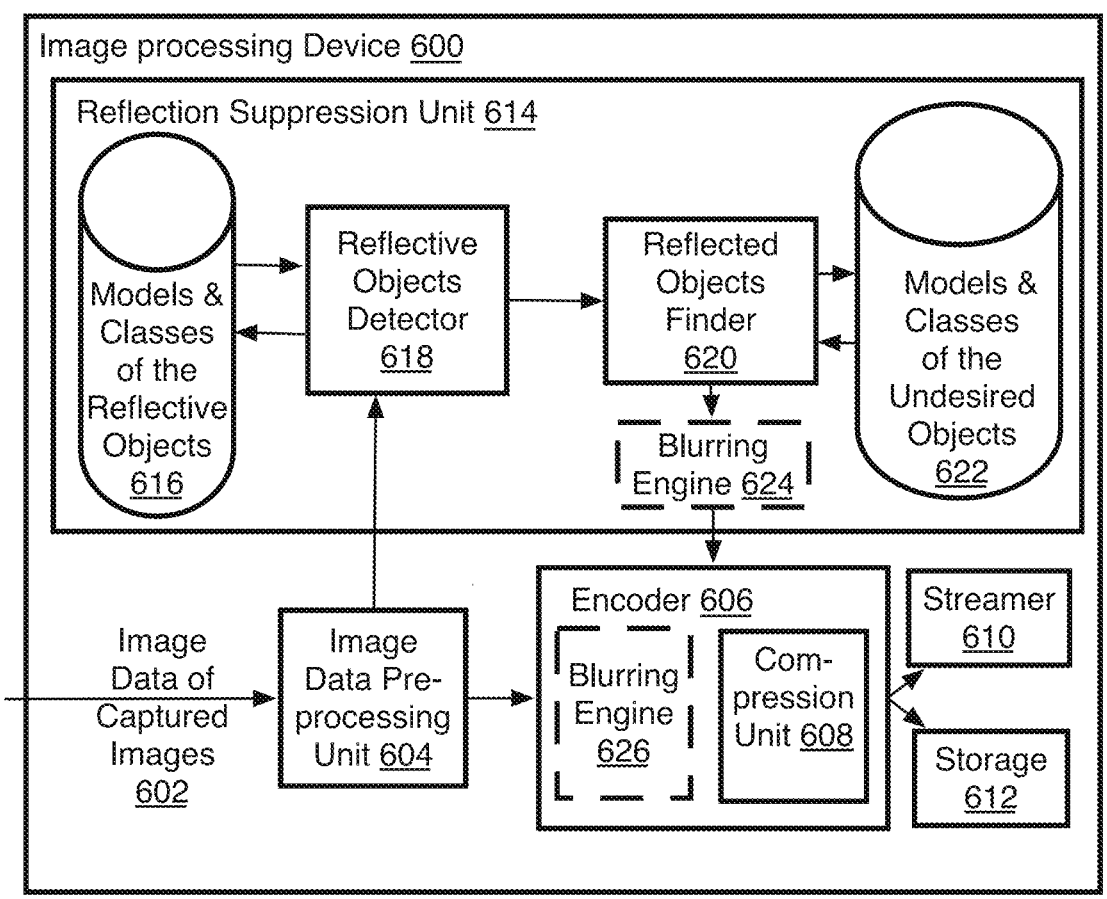
FIG. 6 is a schematic diagram of a system for performing reflection suppression in accordance with the implementations herein.

Referring to FIG. 6, an image processing device 600 may operate a method of reflection suppression according to one or more of the implementations described herein. The image processing device 600 may be, or may have, one or more cameras to capture single shots and/or video sequences, or may be communicatively connected, whether wired or wirelessly, to one or more cameras to receive image data of captured images 602. As mentioned this may in the form of raw data, which is then provided to an image data pre-processing unit 604 that performs pre-processing sufficient to perform reflection suppression, and here encoding as well, as discussed in detail below.

To perform encoding, the pre-processed data now may be provided to an encoder 606 that has a compression unit 608 to compress the image data. This may include components for partitioning images into prediction and transform units such as blocks, slices, and other units, transform (such as discrete cosine transform (DCT)), quantization, a decoding loop that provides refinement filters and both intra and inter prediction, and an entropy coding unit. The compressed data then may be provided to a streamer 610 that packages the image data into packets for example, to be transmitted over data streams such as with the internet, LANs, or other wired or wireless computer or communication networks. Presumably, the image data is received by decoding devices to display the images. Otherwise, the compressed image data also, or alternatively, may be stored for later compression, decompression, and/or display in a storage 612.

As to reflection suppression, the image processing device 600 also may have a reflection suppression unit 614 that receives pre-processed image data from the image data pre-processing unit 604, and provides a blur list of undesired detected objects to be blurred on an image, or it may provide the blurred image data to the encoder itself as explained below.

The reflection suppression unit 614 has a reflective objects detector 618 that applies object recognition to the image data of an image (or frame). Preliminarily, this may include an object recognition algorithm that uses geometric segmentation and sematic segmentation to identify and label all detected objects as discussed in detail below. The detected objects then may be classified with (or matched to) reflective object classifications in an object recognition (OR) models and classes of the reflective objects (or just reflective objects) database (ORMDB) 616. Such classifications may include eye pupils, eye glasses, and so forth. In one form, the classifications represented by the models also are stored in the reflective objects database 616, but could be a separate database, and the classes may be customized by either the original equipment manufacturer (OEM) or by the end user. The classes are the same as, or correspond to, semantic labels so that the system may use semantic comparisons to determine whether a detected object should be classified as a reflective object from the database 616. Additionally or alternatively, deep learning classification algorithms with neural networks and other techniques could be used. The detected reflective objects then may be stored with class, size, shape, location, and other desired data of the image for example.

By one example, once reflective objects have been identified and classified, a reflected objects finder 620 will scan the reflective objects rather than the entire image to perform object recognition and classification only on those detected objects that are on or overlap with reflective objects. This may include performing another object recognition operation to recognize detected objects on the reflective objects sufficient to provide semantic labels for those detected objects. The reflected object finder then may perform semantic comparisons to determine whether a detected object should be classified as an undesired reflected object to be removed. To perform these operations, a black list database 622 (or OR (object recognition) and PR (person recognition) models and classes of the undesired objects database) may hold the models, the corresponding classifications and other data of the undesired reflected objects as described below. As discussed, the black list database 622 may hold multiple classification detail levels, and in one form in a tree structure, such as a human face and the faces of specific people (such as the current U.S. President). The semantic labels may include the same tree structure or may at least have predetermined correspondences to match a semantic label to the correct classification tree of the black list. It will be noted that this operation may omit the object recognition here and just perform matching classifications by semantic comparisons when establishing the reflective objects has already been performed sufficiently to provide labels to detected objects on the reflective objects.

As to the further analysis, the determination as to whether a classified object exists on a reflective object or other object and is an undesired reflected object may be performed by further size, position, and/or semantic scene understanding as described above. Also as mentioned, the order of these operations may be changed where size, position, and semantic understanding analysis may be performed before the classification from the black list database.

Once it is determined that a classified object is an undesired reflected object, the boundaries of the reflected object may be marked for blurring, and this marking may be added to a map or blur list that is provided to a blurring engine. Such boundaries may be in the format of 2D image pixel coordinates.

It should be noted that for other modes mentioned above, such as the brute mode, the reflective objects detector may be used without use of the reflected objects finder, and in the pure black list mode, the reflective objects detector may not be used while the reflected objects finder may be used alone.

A blurring engine 624 or 626 of the reflection suppression unit 614 may be provided either as part of the encoder to blur objects on the image before the image data is provided to the compression unit of the encoder to partition the image into units used depending on the codec used, such as blocks, but alternatively could be considered a part of the reflection suppression unit 614 separate from the encoder 606 to provide the modified image data to the encoder 606 as shown at alternative locations on FIG. 6. In yet another alternative, the blur engine 624 may be a blur control that sets the areas to be blurred and what blurring actions are to be taken, and the blur engine 626 is the blurrer component to actually apply the blurring. The image data of the blurring is referred to as a mask, and the blur engine 624 or 626 may implement many different technologies for blurring the undesired reflected objects sufficient to avoid disclosure of confidential and private information, while preserving aesthetics of the resulting picture by factoring the image data of the reflective or other object near or adjacent the reflected object for example. Blurring may be performed by using the background color as a dominating color in color fusion, but other techniques may be applied as well. The details of these operations are provided below with process 700.

Figure 7A:
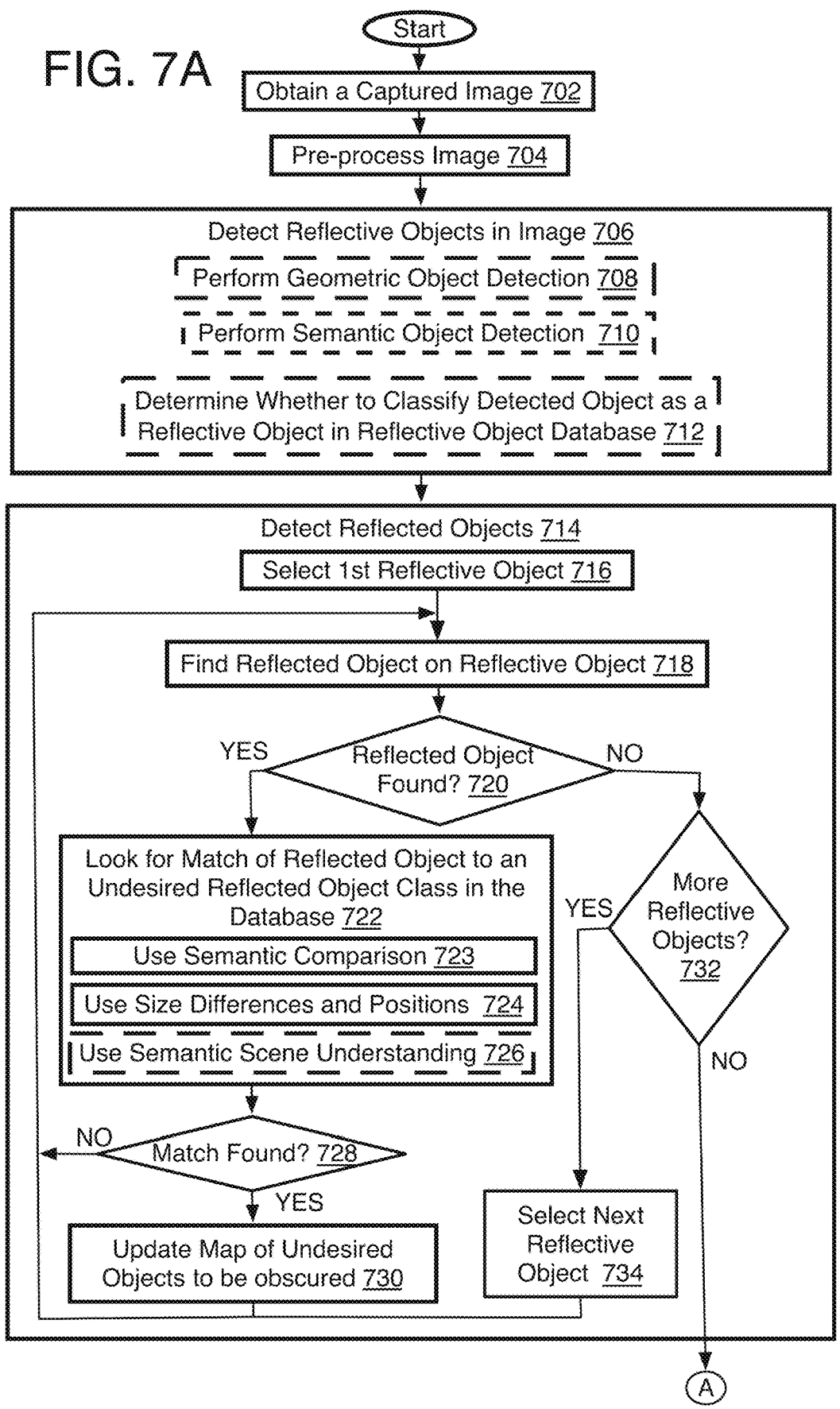
FIGS. 7A-7B is a detailed flow chart of a method of reflection suppression for image processing in accordance with the implementations herein.
Figure 7B:
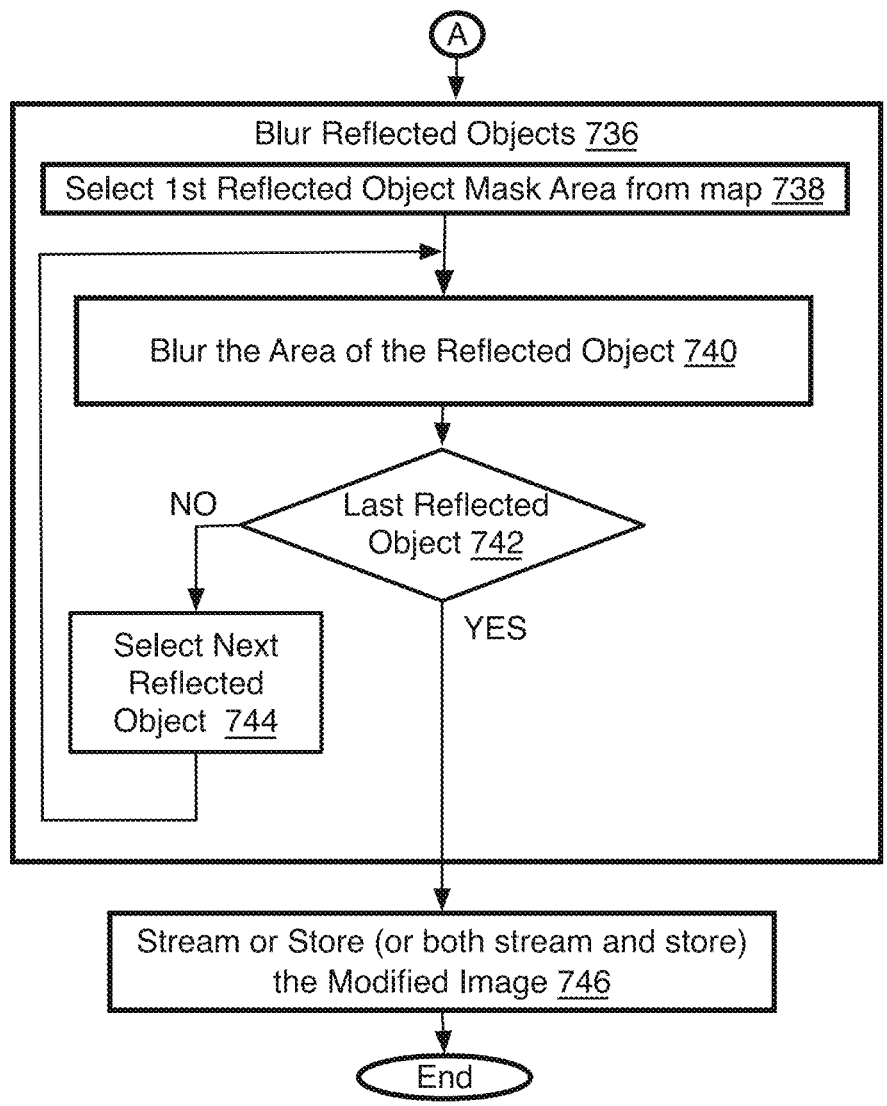

Referring to FIGS. 7A-7B, a process 700 is provided for a method of reflection suppression for image processing. In the illustrated implementation, process 700 may include one or more operations, functions or actions 702 to 746 numbered evenly. By way of non-limiting example, process 700 may be described herein with reference to example image processing system 600 of FIG. 6 or system 1200 of FIG. 12, and where relevant.

As a preliminary matter, the reflection suppression may be implemented as a built in configurable function on a computing device that can be selectively activated by the user.

Once activated, and one or more images have been captured, process 700 may include "obtain a captured image" 702 and "pre-process image" 704. This may include obtaining individual images or frames of a video sequence or may be individual still photos. Such images initially may be provided in raw RGB data or RGBD data, and pre-processing the image data refers to pre-processing of the image data sufficient for reflection suppression including for any object recognition techniques that may be used, but in one form, also may be sufficient for encoding of the image data as explained below. Thus, the pre-processing may include de-mosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

These operations also may refer to individually performing the method on every image in a video sequence in real time for example. Some interval could be used instead. However, this is not suggested since those attempting to obtain information may have the technology to look at a video sequence frame by frame to determine if secret information is disclosed, unless the frames between blurred images also are blurred by interpolation rather than direct blurring for example. The following presents a method to analyze a still photo or video sequence one frame at a time.

Process 700 may include "detect reflective objects in image" 706, and this refers to receiving pre-processed image data of an image and applying object detection to the image. This may first include "perform geometric object detection" 708, and this may involve generating a depth map for the current image to establish a 3D space. This actually may involve multiple images from different angles for stereo systems or from single cameras as described above. The depth map may be used to build a 3D geometric model. Otherwise, modeling algorithms such as RGB-SLAM (simultaneous localization and mapping) or other such algorithms may be used. See for example, Newcombe, et al., "KinectFusion: Real-time dense surface mapping and tracking", ISMAR (pp. 127-136), IEEE Computer Society (2011). This creates a geometric model that can be used for 3D object recognition and segmentation.

Thereafter, process 700 may include "perform semantic object detection" 710. Such semantic object recognition or segmentation may include deep learning neural network analysis which can be performed by many different convolution neural network (CNN) architectures. A resulting segmentation model may be based on 2D or 3D data that is registered to the geometric model. Some example frameworks combine a geometric segmentation algorithm with a 3D semantic segmentation algorithm. Examples of such object recognition techniques include Intel® RealSense™ applications as well as a genetic-based algorithm such as Swets, D. et al., "Genetic Algorithms for Object Localization in a Complex Scene", http://ieeexplore.ieee.org/-abstract/document/537549/?reload=true; or a heuristic algorithm based on oriented filters such as Blanz, V., "Comparison of view-based object recognition algorithms using realistic 3D models", https://link.springer.com/chapter/10.1007%2F3-540-61510-5_45?LI=true, in Proceedings ICANN, International Conference on Artificial Neural Networks, Springer, Verlag, Berlin (1996); a dense RGB-SLAM and semantic segmentation combination is provided by Tateno et al., "Real-time and scalable incremental segmentation on dense SLAM", IROS (2015). These semantic segmentation processes create a 3D semantic model that maintains the semantic label of individual voxels. The result from these initial object recognition operations is one or more detected objects including the location, shape, and size of the object and whether in the form of a single label for the object or in the form of labels of individual 3D voxels or polygons forming the detected object.

As mentioned above as one alternative, this object recognition primarily directed to recognizing reflective objects also may detect potential reflected objects on the potential reflective objects. To ensure this is accurately detecting reflected objects versus objects merely in front of the reflective object, one approach may be to immediately apply a secondary object recognition operation such as SLAM, 3D vision, Ultra Sound, and so forth. By one alternative, the potential reflected objects are stored so that initial object recognition does not need to be repeated later. By other forms, however, a more precise close-up object recognition may be performed after reflective objects are classified and for detecting potential reflected objects providing better accuracy and as described below for operations detecting reflected objects.

Process 700 may include "determine whether to classify detected object as a reflective object in reflective object database" 712, and as described above, this may include semantic comparisons to compare the semantic label of a detected object to the classes in the reflective object database. The semantic label may be compared to each class and sub-class in the database, or may be found to match particular trees (e.g., human face) or the most generic class of the tree, and may only be compared to the classes on that tree. As mentioned, the semantic labels may have the same or different class structure as the classes of the reflective object database, and predetermined correspondences may be used to match label and class that are not exactly the same. Such techniques are provide by Wordnet® applications for example.

The reflective object database may have classes for eyes, eye glasses, and other objects with surfaces that are likely to cause reflections and as already listed above. This may include objects with glass surfaces and smooth reflective surfaces that are not glass. When a match is found, the detected object is provided that class, saved, and by one form, placed on a protected objects list. This is repeated for each detected object on the image.

Alternatively, this may include deep learning algorithms to match a model of the detected object with models in a reflective object database. The input to the algorithm may be the 2D or 3D locations of features on the model of the detected object that are compared to the features of the models in the database. The output is the highest probability classification of the detected object. When such probability is sufficiently high, the detected object is provided that class, saved, and by one form, placed on a protected objects list.

Alternatively, it will be understood that in a pure black list mode mentioned above, the reflective object detection is omitted instead.

Process 700 may include "detect reflected objects" 714, where here when reflective objects have been classified, process 700 may include "select $1^{st}$ reflective object" 716. The reflective objects may be listed in some order on the protected objects list but the order may not be critical here. The first reflective object on the protected object list is selected to determine if reflected objects exist on the reflective object.

Thus, process 700 may include "find reflected object on reflective object" 718. In this case, when reflective objects were found by determining the boundaries of the reflective objects, the image processor will effectively zoom-in and scan the areas of the reflective objects to determine whether reflected objects exist in those areas by finding objects that are within or cross the reflective object boundaries. Thus, when the reflective object is a human eye or pupil, the system scans the pixels in the pupil.

Object recognition algorithms may be applied to the areas of the reflective objects. The example algorithms for object recognition here are the same as those mentioned above for reflective object recognition. Additional example algorithms for person recognition may include a Principal Component Analysis (PCA) based face recognition algorithm such as Moon, H., "Computational and Performance Aspects of PCA-Based Face-Recognition Algorithms", Perception, vol. 30. Pp. 303-321, http://journals.sagepub.co-m/doi/abs/10.1068/p2896 (2001); or a Linear Discriminant Analysis (LDA) based face recognition algorithms such as Plataniotis, K et al., "Face recognition using LDA-based algorithms", IEEE Transactions on Neural Networks, vol. 14, no. 1, pp. 195-200, http://ieeexplore.ieee.org/abst-ract/document/1176138 (2003); or a Support Vector Machine (SVM) based face recognition algorithm such as Phillips, P. J., "Support Vector Machines Applied to Face Recognition", National Institute of Standards and Technology, Internal Report (NISTIR)—6241, http://pap-ers.nips.cc/paper/1609-support-vector-machines-applied-to-face-recognition .pdf (1998). This will result in a semantic label for each detected object found on the reflective object.

Process 700 may include the inquiry "reflected object found?" 720, and if so, the process 700 may include "look for match of reflected object to an undesired reflected object class in the database" 722. This operation may include "use semantic comparison" 723. Thus, as mentioned above for the reflective object classification, the semantic label of the detected object found on the reflective object is compared to the classes in the black list database. This may include comparing the label to all of the classes or some sub-set of the classes such as to particular trees as described above when the labels may be more generic than the classes (or vice-versa) as with the semantic comparisons for reflective object classification.

The black list database classes will cover classes of objects that are considered secret or private and that should be removed from the image such as a person's face or documents, and these may each have sub-classes on tree structures to provide multiple levels of detail or generic-level as already described above. Such applications that can provide the logic and operations to perform the label to class matching despite differences in terms may be provided by Wordnet® as one example and as already mentioned above.

Also as noted above with reflective object classification, in addition to, or instead of, semantic comparisons, the classification may include deep learning algorithms to match a model of the detected object with models in a reflected object black list database. Here to, the input to the algorithm may be the 2D or 3D locations of features on the model of the detected object that are compared to the features of the models in the database. The output may be an indicator of the classification of the detected object. Many other algorithms could be used as well.

Once a detected object has its classification as an undesired reflected object, further analysis may be applied to ensure this is correct. Thus, process 700 may include "use size differences and positions" 724. As described above, size alone may be a criteria when the current classified detected object is on a reflective object since this has already found the detected object to be on the surface of the reflective object. Otherwise, the size is analyzed in conjunction with the position of the classified detected object to determine if the classified detected object is on the surface of another object. If not, then the object will remain on the image. If so, a classification match has been found, and it is confirmed that the detected object is an undesired reflected object to be removed.

Additionally, or alternatively, process 700 may include "use semantic scene understanding" 726 which detects situations that do not make sense, e.g., a face on a cup, a book on eye glasses, etc. This technique may rely on analysis of the shapes overlapping the reflective objects and known object sizes. Once it is concluded that the scene does not make sense, it is confirmed that a match has been found.

Also as noted above, the order of the semantic comparisons, size and position confirmation, and scene understanding confirmation can be changed from what is provided above to whatever order is most efficient. By one form, this includes using whichever technique first that will eliminate the most objects that could need reflection suppression.

Process 700 may include the inquiry "match found?" 728. If no, the object is dropped, and the process loops back to operation 718 to find the next reflected object on the current reflective object being analyzed. If yes a match is found, and the classified detected object is confirmed to be an undesired reflected object to be removed from the image, the detected object may be added to a blur list. Thus, process 700 may include "update map of undesired objects" 730, which also may be referred to herein as the blur list (or BlurList). The blur list may include all necessary spatial coordinates and sizes to blur its content. A pseudo code-style structure below specifies one example format of the BlurList where each undesired reflected object to be removed by blurring has a rectangle to define the boundary of the undesired reflected object, and in turn the mask to change the image data of the object.

```
Struct{
    Reflective Object Type: Type of the reflective object (e.g. pupil,
        glasses, etc.)
    Detected Object Type: Type of the detected reflected object (e.g,
        face, screen, document, etc.)
    Object ID: Unique ID identifying object within the string (string,
        optional)
    X:X - offset in pixels within the frame from upper left corner
    Y:Y - offset in pixels within the frame from upper left corner
    H:Rectangle height
    L:Rectangle width
} Blur List;
```

The process 700 then loops back to operation 718 to find the next reflected object on the current reflective object being analyzed.

When no reflected object is found (720) on a reflective object, process 700 then may include inquiry "more reflective objects?" 732, to determine whether more reflective objects are listed on the protected objects list. If yes, process 700 may include "select next reflective object" 734, where the image data of the next recognized reflective object from the image and on the protected object list is obtained, and the process loops back to operation 718 to find any reflected objects on that next reflective object.

If, however, all of the reflective objects have been scanned for reflected objects, then the blurring operations now may be performed. Process 700 may include "blur reflected objects" 736. As mentioned, blurring refers to any change in the image data to effectively remove the reflected object from the image by making it at least unrecognizable so that it cannot disclose secret or confidential information. Thus, herein, changing the reflected object to a single color or multiple pattern of colors is considered to be blurring herein. By one approach, the method is not particularly limited to any one blurring technique as long as the blurring changes the image data (the chroma values in YUV or color values of RGB of the pixels, for example) so that the reflected object is irreversibly blurred. By other approaches, the blurring could be reversible if that is desired.

To perform this operation, process 700 may include "select 1$^{st}$ reflected object mask area from map" 738, and this refers to selecting the first listed reflected object area from the blur list or blur map. The blur list or map may or may not list the reflected object areas in order of reflective object for blurring operations. At this point, all of the reflected object areas for an image may be listed and blurred regardless of order of reflective objects. Otherwise, the reflected objects of one reflective object may be blurred before blurring the reflected objects of the next reflective object and so forth.

Then, process 700 may include "blur the area of the reflected object" 740. This may be performed by using those blurring techniques as in photo editor applications such as Photoshop®, Picasa®, and so forth.

Figure 8:
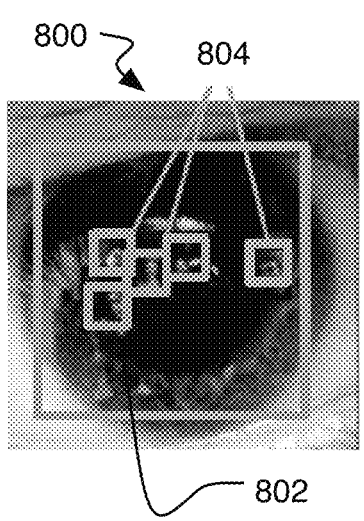
FIG. 8 is an image with unintentional undesired detected objects shown in the image.
Figure 9:
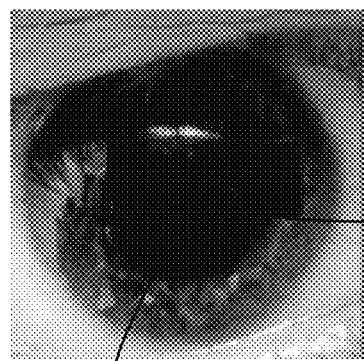
FIG. 9 is an image with unintentional undesired detected objects removed from the image in accordance with at least one of the implementations disclosed herein.
Figure 10A:
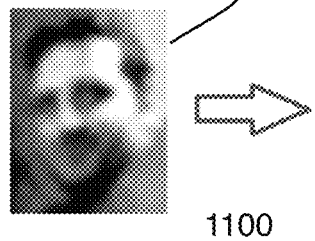
FIG. 10A is an image with unintentional undesired detected objects shown in the image.
Figure 10B:
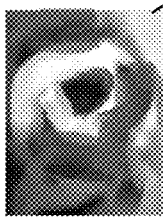
FIGS. 10B-10D are images with unintentional undesired detected objects removed from the image in accordance with at least one of the implementations disclosed herein.
Figure 10C:
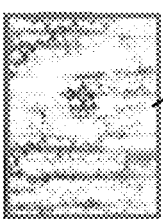
Figure 10D:
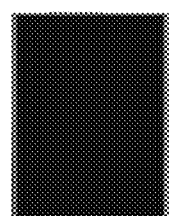

Referring to FIGS. 8-9, an example of application of the present method is provided where an image 800 is corrected in image 900. A reflective object 802 in the form of a pupil of a human is recognized, and within the reflective object 802, multiple reflected objects 804 are recognized in the form of faces. Image 800 is the same as image 402 (FIG. 4B). As shown on image 900, once the method is applied and the faces 804 are detected and then blurred by changing the image data of the faces to black that matches the surrounding color of the pupil, the faces are removed, and there are no faces to disclose secret or confidential information. The color may be selected so that the color blends in with the remainder of the surrounding or reflective object and the mask is not visible. Thus, a white mask should be used with a white background and so forth.

Referring to FIGS. 10A-10D, an example undesired reflected object is shown in an image 1000 (FIG. 10A) in the form of a face. Alternative techniques for blurring the undesired object are shown in images 1002 (FIG. 10B), where multiple colors of the image data of the undesired object 1000 is scrambled or moved to form a mask by using a color fusion technique or a Gaussian Blur. Alternatively, image 1004 (FIG. 10C) shows a blurring of the undesired object 1000 by Weierstrass Transformation. These two methods also may use scrambling of image data into a random pattern or a predetermined pattern (such as movement of all colors in a certain direction and distance on the image), and may use colors within the undesired object, near or adjacent the undesired object such as on a reflective object, or both. Otherwise, the image data of the undesired object 1000 may be changed to a single color such as black as shown in image 1006 (FIG. 10D) where the single color may be obtained from the undesired object itself or from the nearby or adjacent object such as the reflective object.

Figure 11A:
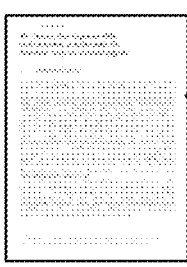
FIG. 11A is an image with unintentional undesired detected objects shown in the image.
Figure 11B:
FIGS. 11B-11C are images with unintentional undesired detected objects removed from the image in accordance with at least one of the implementations disclosed herein.
Figure 11C:
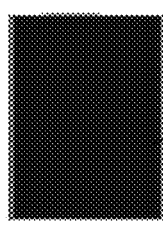

Referring to FIGS. 11A-11C, another example of alternative results is provided to show blur of an image 1100 (FIG. 11A) of an undesired object in the form of a document. In this document example, blurring may be performed by the technique of Gaussian blur or Weierstrass Transformation mentioned for the face blurring on image 1004 and shown similarly as blurred object 1102, or by use of single color blurring as mentioned for image 1006 and shown here as blurred object 1104 that is completely black as well.

Process 700 may include the inquiry "last reflected object?" 742, and if more reflected objects exist on the blur list, the process 700 then may include "select next reflected object" 744 where the image data of the next reflected object is obtained, and the process loops back to operation 740 to blur the image data of the area of the obtained next reflected object on the image.

When no more reflected objects need to be blurred for the image, the process 700 may include "stream or store (or both stream and store) the modified image" 746, where the image then may be compressed by an encoder and transmitted wirelessly or by wire to other devices with a decoder for decompression and display, or may be stored in a decompressed or compressed state for later transmission and/or viewing. When encoding is involved, the image with the reflected objects blurred may be provided to an encoder before the encoder provides the image data to a compression unit that begins the compression process. Thus, for example, to partition the image into blocks and so forth before any transform and quantization operations.

In addition, any one or more of the operations of FIGS. 5 and 7A-7B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
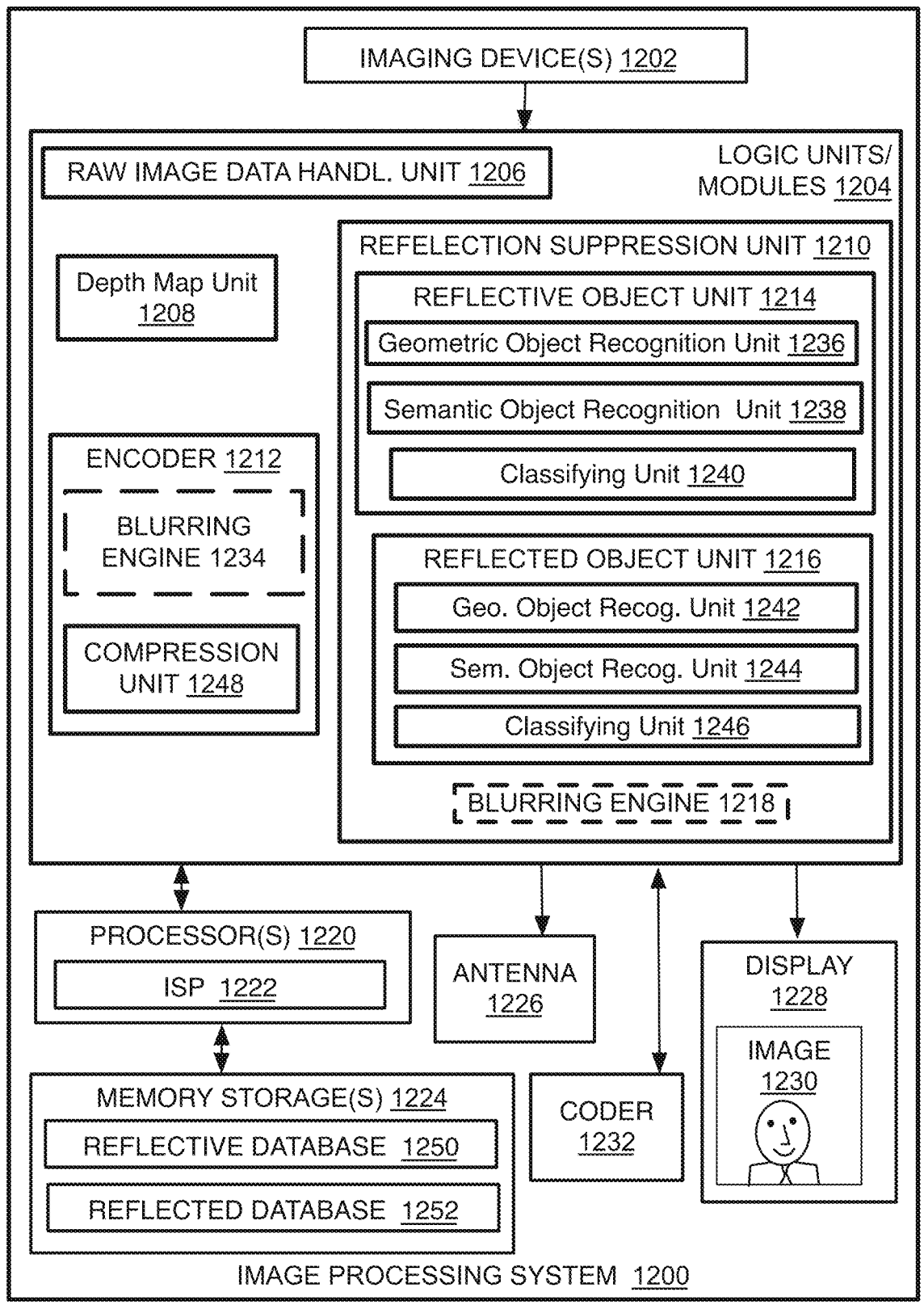
FIG. 12 is an illustrative diagram of an example system.

Referring to FIG. 12, an example image processing system 1200 is arranged in accordance with at least some implementations of the present disclosure. In various implementations, the example image processing system 1200 may have an imaging device 1202 to form or receive captured image data. This can be implemented in various ways. Thus, in one form, the image processing system 1200 may be one or more digital cameras or other image capture devices, and imaging device 1202, in this case, may be the camera hardware and camera sensor software, module, or component. In other examples, image processing system 1200 may have an imaging device 1202 that includes or may be one or more cameras, and logic modules 1204 may communicate remotely with, or otherwise may be communicatively coupled to, the imaging device 1202 for further processing of the image data.

Thus, image processing system 1200 may be a single camera alone or on a multi-camera device either of which may be a smartphone, tablet, laptop, or other mobile device with still photo and/or video recording capability. Otherwise, system 1200 may be the device with multiple cameras where the processing occurs at one of the cameras or at a separate processing location communicating with the cameras whether on-board or off of the device, and whether the processing is performed at a mobile device or not.

In any of these cases, such technology may include a camera such as a digital camera system, a dedicated camera device, or an imaging phone or tablet, or other video camera, or some combination of these. Thus, in one form, imaging device 1202 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1202 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In these examples, in addition to a camera sensor, the same sensor or a separate sensor may be provided as well as light projector, such as an IR projector to provide a separate depth image that can be used for triangulation with the camera image. Otherwise, the imaging device may have any other known technology for providing depth maps by using multiple camera or imaging devices, or a single imaging device.

In the illustrated example and relevant here, the logic modules 1204 may include a raw image handling unit 1206 that performs pre-processing on the image data sufficient for reflection suppression but also may be sufficient for encoding as well, and a depth map unit 1208 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene). The logic modules 1204 also may have a reflection suppression unit 1210 and an encoder 1212. The reflection suppression unit 1210 may have a reflective object unit 1214, a reflected object unit 1212, and either a blurring engine 1218 that is considered part of the reflection suppression unit 1210 or a blurring engine 1234 that is considered to be a part of the encoder 1212 (or components on both such as a control and blurrer as described above). The reflective object unit 1214 may have a geometric object recognition unit 1236, a semantic object recognition unit 1238, and a classifying unit 1240. Likewise, the reflected object unit 1216 may have a geometric object recognition unit 1242, a semantic object recognition unit 1244, and a classifying unit 1246. The encoder also may have a compression unit 1248. These components perform tasks according to operations mentioned above with methods 500 and 700, and the title of the unit indicates the type of tasks that may be performed by that unit, and these components may be, include, or may be part of, the components of system 600 described above.

The image processing system 1200 may have one or more processors 1220 which may include a dedicated image signal processor (ISP) 1222 such as the Intel Atom or other lower-power processing units, memory stores 1224, one or more displays 1228 to provide images 1230, a coder 1232, and antenna 1226. In one example implementation, the image processing system 1200 may have the display 1228, at least one processor 1220 communicatively coupled to the display, and at least one memory storage 1224 communicatively coupled to the processor. The coder 1232 may be a decoder but could additionally include an encoder as well. The encoder 1212 or 1232, and with antenna 1234, may be provided to compress image data for transmission to other devices that may display or store the image. It will be understood that as a decoder, the coder 1232 may receive and decode image data for processing by the system 1200 to receive images for reflection suppression in addition to, or instead of, initially capturing the images with the device 1200. Otherwise, the processed image 1230 may be displayed on display 1228 or stored in memory storage(s) 1224. Memory storage(s) 1224 may store the reflective (object) database 1250 and the reflected (object) database 1252 as well as the image data, applications, and so forth.

As illustrated, any of these components may be capable of communication with one another and/or communication with portions of logic modules 1204 and/or imaging device 1202. Thus, processors 1220 may be communicatively coupled to both the image device 1202 and the logic modules 1204 for operating those components. By one approach, although image processing system 1200, as shown in FIG. 12, may include one particular set of blocks or actions associated with particular components or modules, these blocks or actions may be associated with different components or modules than the particular component or module illustrated here.

Figure 13:
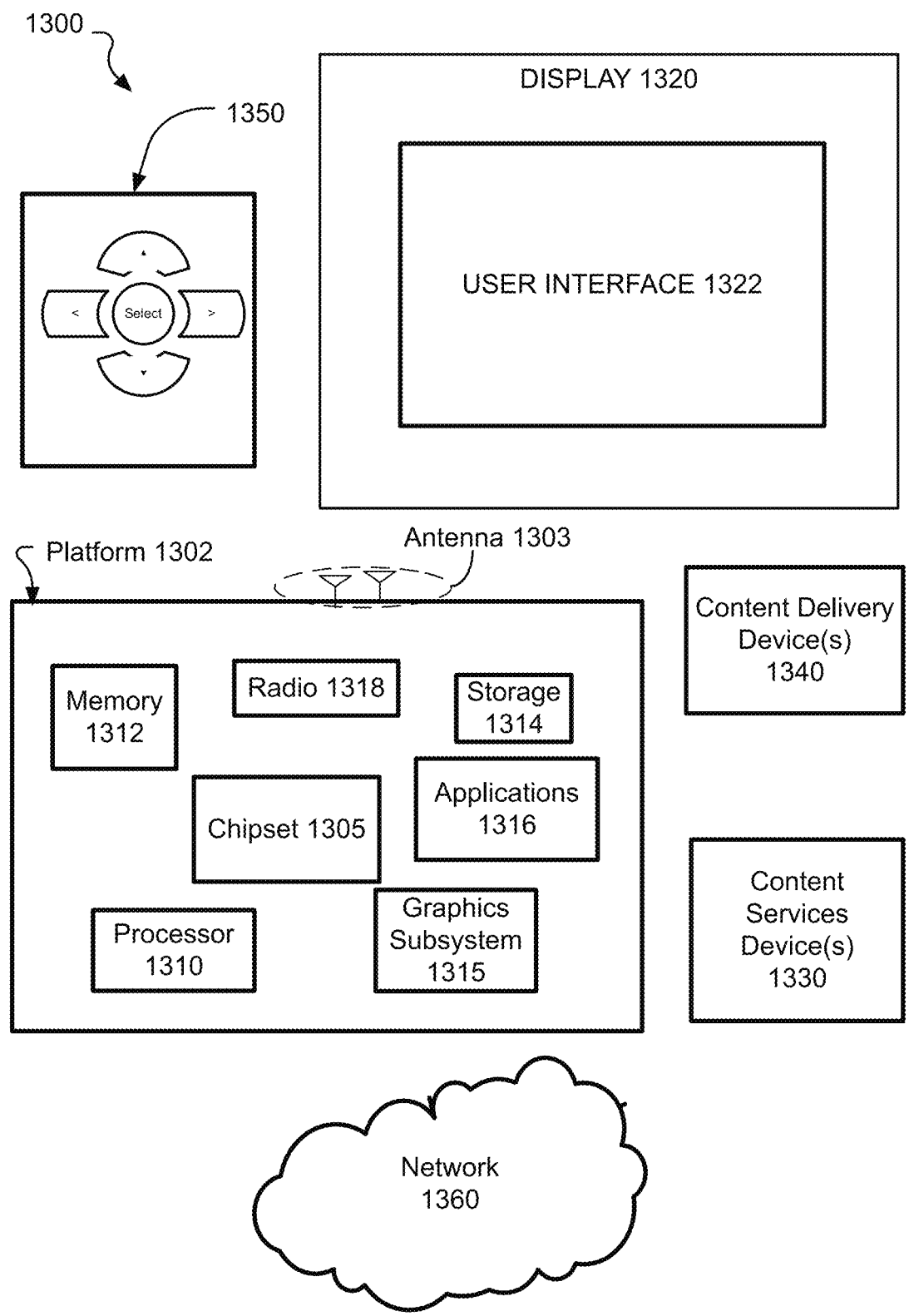
FIG. 13 is an illustrative diagram of another example system.

Referring to FIG. 13, an example system 1300 in accordance with the present disclosure operates one or more aspects of the image processing system described herein. It will be understood from the nature of the system components described below that such components may be associated with, or used to operate, certain part or parts of the image processing system 1300 described above, and therefore, used to operate the methods described herein. In various implementations, system 1300 may be a media system although system 1300 is not limited to this context. For example, system 1300 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas 1303, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
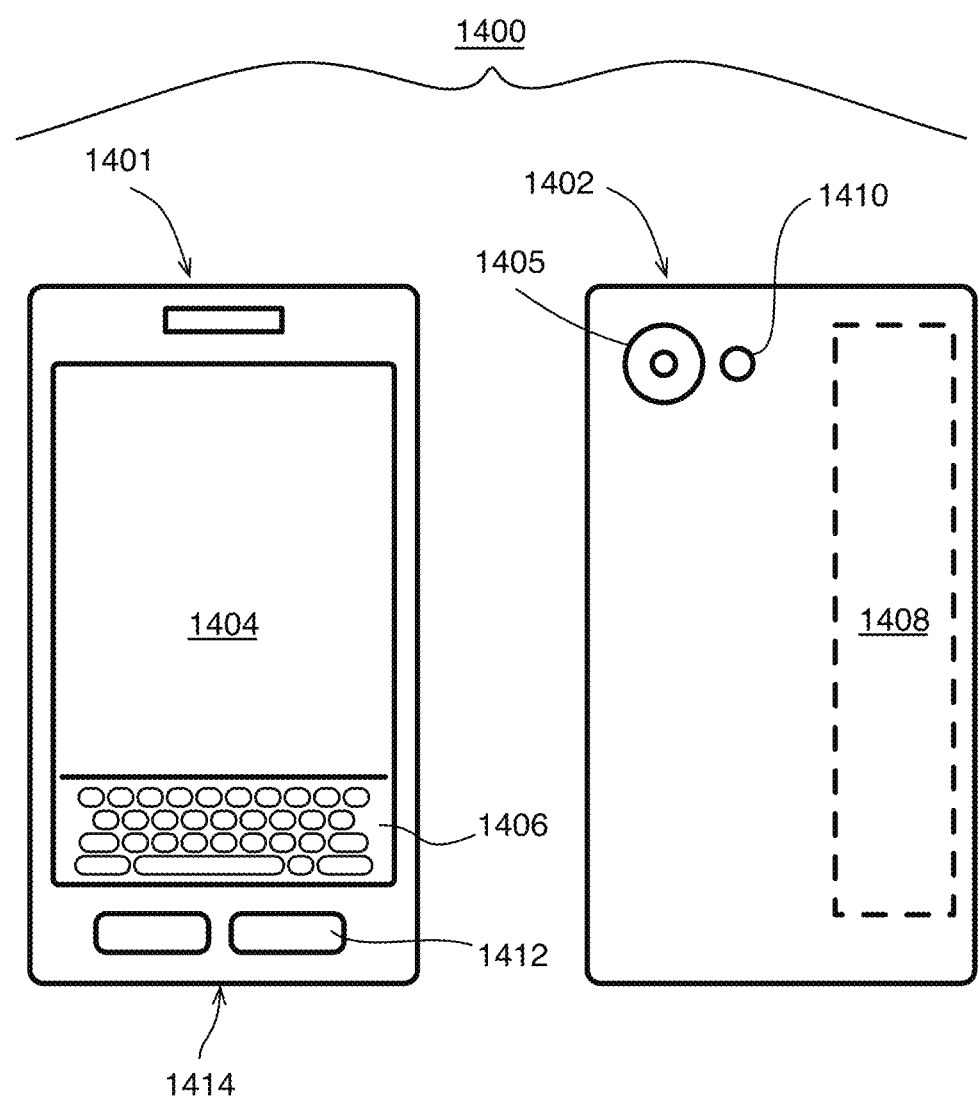
FIG. 14 illustrates another example device, all arranged in accordance with at least some implementations of the present disclosure.

Referring to FIG. 14, a small form factor device 1400 is one example of the varying physical styles or form factors in which systems 1200 or 1300 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone 1414, or may be digitized by a voice recognition device. As shown, device 1400 may include a camera 1405 (e.g., including at least one lens, aperture, and imaging sensor) and an illuminator 1410, such as those described herein, integrated into back 1402 (or elsewhere) of device 1400. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of reflection suppression for image processing comprises obtaining at least one image of a scene captured by a camera; automatically recognizing objects in the image comprising automatically determining whether at least one of the detected objects is an undesired object to be blurred on the image; and automatically blurring at least one of the undesired objects in the image.

By another implementation, this method may comprise wherein the determining comprises determining whether a detected object matches at least one undesired object listed in a database of undesired objects; wherein the determining comprises comparing the size of detected objects to each other to determine whether a detected object is an undesired object; wherein the undesired objects are characterized as objects significantly smaller than other objects on the image; wherein the determining comprising using 3D positions of the detected objects to make a determination as to whether a detected object is an undesired reflected object; wherein the undesired object is an undesired reflected object, and wherein the determining comprises identifying at least one reflective detected object likely to display the undesired reflected object, and searching for undesired reflected objects on the reflective detected object(s) rather than an entire image; wherein the reflective detected objects are listed in a database and are objects with smooth reflective surfaces; wherein reflective detected objects are listed in a database comprising at least one of: eye glasses, mirrors, glass windows, glass doors, eyes, watches, water surfaces, and display screens; wherein the reflected detected objects are listed in a database, and the method comprising comparing the detected objects to the listed undesired reflected objects to attempt to identify the detected object as an undesired reflected object; performing semantic object recognition to identify the reflective detected objects, reflected detected objects, or both, wherein the determining comprises using semantic scene understanding to make the determination as to whether a detected object is an undesired reflected object; wherein the blurring comprises irreversibly changing the image data of the undesired object and sufficiently changing so that confidential or secret information cannot be attained from the undesired object; wherein the blurring comprises changing the color of pixel image data of the undesired detected object with at least one of: a single color the same or similar to a color of image data adjacent or near the undesired detected object on the image, a single color found forming the undesired detected object on the image, multiple colors in a random pattern and similar or the same to colors of image data adjacent or near the undesired detected object on the image, multiple colors in a predetermined pattern similar or the same to colors of image data adjacent or near the undesired detected object on the image, multiple colors in a random pattern and found forming the undesired detected object on the image, and multiple colors in a predetermined pattern found forming the undesired detected object on the image.

By a further implementation, a computer-implemented system of reflection suppression for image processing, comprising at least one display; at least one memory storing at least one image of a scene captured by a camera; at least one processor communicatively coupled to the display and the memory; and a reflection suppression unit operated by the at least one processor and to operate by: automatically recognizing objects in the image comprising automatically determining whether at least one of the detected objects is an undesired object to be blurred on the image; and automatically blurring at least one of the undesired objects in the image.

The system also may include wherein the undesired objects are undesired reflected objects that are listed in a database, the reflection suppression unit operating by comparing the detected objects to the listed undesired reflected objects to determine whether the detected object should be classified as an undesired reflected object; wherein the undesired reflected objects listed in the database comprise at least one of: a human face regardless of the identity of a person, a face of a specific person, a document with writing regardless of what words are written, and a document with specific automatically recognizable words; wherein the reflection suppression unit performs the determining by using the size and 3D positions of the detected objects relative to each other to determine whether a detected object is an undesired object; wherein the reflection suppression unit performs the determining by using a semantic scene understanding of the image to label a first detected object an undesired detected object when the first detected object is on another detected object when it does not make sense for the first detected object to be on the another detected object; wherein the reflection suppression unit performs the determining by determining whether detected objects are reflective objects more likely to have an undesired detected object on a surface of the reflective object, and wherein the another detected object is limited to detected objects determined to be reflective objects; where the determining whether detected objects are reflective object comprises comparing the detected objects to predetermined reflective objects listed in a reflective object database.

As another implementation, at least one computer-readable medium having stored thereon instructions that when executed cause a computing device to operate by: obtaining at least one image of a scene captured by a camera; automatically determining whether one or more detected objects in the image are reflective objects that are likely to cause a reflection; and automatically determining whether one or more detected objects in the image is at least one undesired reflected object; and automatically blurring the at least one undesired reflected object in the image when the undesired reflected object is found to be at least partially disposed on at least one of the reflective objects.

The instructions also may cause the computing device to operate so that the determining comprises performing a semantic comparison to determine whether a detected object matches at least one undesired object listed in a database of undesired objects; wherein the determining comprises comparing the size and 3D position of detected objects to each other to determine whether a detected object is an undesired object; wherein the determining comprises using a semantic scene understanding of the image to label a first detected object an undesired detected object when the first detected object is on another detected object when it does not make sense for the first detected object to be on the another detected object, wherein the determining comprises determining whether detected objects are reflective objects more likely to have an undesired detected object on a surface of the reflective object, and wherein the another detected object is limited to detected objects determined to be reflective objects.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of reflection suppression for image processing, comprising:
   obtaining at least one image of a scene captured by a camera;
   performing semantic reflective object recognition to detect at least one reflective object in the image by searching the image for multiple different reflective objects rather than non-reflective objects wherein the reflective objects each have a different semantic label in a list of multiple semantic reflective object labels;
   performing semantic reflected object recognition comprising searching only on the reflective objects on the image rather than searching the entire image to detect at least one undesired reflected object on the at least one reflective object and wherein the reflected object is a reflection in the image of at least part of an original object that was not visible to the camera while capturing the scene, and wherein the reflected object has a semantic label in a list of semantic reflected object labels, and
   wherein the searching comprising using 3D positions of the detected objects to make a determination as to whether a detected object is an undesired reflected object; and
   automatically blurring at least one of the detected undesired reflected objects in the image to attempt to make at least a part of the undesired reflected object unidentifiable on the reflective object by people viewing the image.

2. The method of claim 1 wherein the searching comprises determining whether a detected object matches at least one undesired reflected object listed in a database of undesired reflected objects.

3. The method of claim 1 wherein the searching comprises comparing the size of detected objects to each other to determine whether a detected object is an undesired reflected object, wherein the object is undesired when the object is an unrealistic size compared to a size of the reflective object.

4. The method of claim 3 wherein the undesired reflected objects are characterized as objects significantly smaller than other objects on the image.

5. The method of claim 1 wherein the reflective objects are listed in a database and are objects with smooth reflective surfaces.

6. The method of claim 1 wherein reflective objects are listed in a database because the objects are reflective and comprising at least eye glasses, mirrors, glass windows, glass doors, eyes, watches, water surfaces, and display screens.

7. The method of claim 1 wherein undesired reflected objects are listed in a database, and the method comprising comparing detected objects to the listed undesired reflected objects to attempt to identify a detected object as an undesired reflected object.

8. The method of claim 1 wherein the searching comprises using semantic scene understanding to make the determination as to whether a detected object is an undesired reflected object where it is undesired because it is reflected.

9. The method of claim 1 wherein the blurring comprises irreversibly changing the image data of the undesired reflected object and sufficiently changing so that confidential or secret information cannot be attained from the undesired reflected object.

10. The method of claim 1 wherein the blurring comprises changing the color of pixel image data of the undesired reflected object with at least one of:
    a single color the same or similar to a color of image data adjacent or near the undesired reflected object on the image,
    a single color found forming the undesired reflected object on the image,
    multiple colors in a random pattern and similar or the same to colors of image data adjacent or near the undesired reflected object on the image,
    multiple colors in a predetermined pattern similar or the same to colors of image data adjacent or near the undesired reflected object on the image,
    multiple colors in a random pattern and found forming the undesired reflected object on the image, and
    multiple colors in a predetermined pattern found forming the undesired reflected object on the image.

11. A computer-implemented system of reflection suppression for image processing, comprising:
    at least one display;
    memory storing at least one image of a scene captured by a camera;

at least one processor communicatively coupled to the display and the memory, and the at least one processor being arranged to operate by:

performing semantic reflective object recognition to detect at least one reflective object in the image by searching the image for multiple different reflective objects rather than non-reflective objects wherein the reflective objects each have a different semantic label in a list of multiple semantic reflective object labels;

performing semantic reflected object recognition comprising searching only on the reflective objects on the image rather than searching the entire image to detect at least one undesired reflected object on the at least one reflective object and wherein the reflected object is a reflection in the image of at least part of an original object that was not visible to the camera while capturing the scene, and wherein the reflected object has a semantic label in a list of semantic reflected object labels, and wherein the processor performs the searching by using the size and 3D positions of the detected objects relative to each other to determine whether a detected object is an undesired reflected object when the reflected object is an unrealistic size compared to the reflective object; and automatically blurring at least one of the detected undesired reflected objects in the image to attempt to make at least a part of the undesired reflected object unidentifiable on the reflective object by people viewing the image.

12. The system of claim 11 wherein the undesired reflected objects are undesired reflected objects that are listed in a database, the processor operating by comparing the detected objects to the listed undesired reflected objects to determine whether the detected object should be classified as an undesired reflected object.

13. The system of claim 12 wherein the undesired reflected objects listed in the database comprise at least one of:

a human face regardless of the identity of a person,
a face of a specific person,
a document with writing regardless of what words are written, and
a document with specific automatically recognizable words.

14. The system of claim 11 wherein the processor performs the searching by using a semantic scene understanding of the image to label a first detected object an undesired reflected object when a first detected object is on another detected object when it does not make sense for the first detected object to be on the another detected object.

15. The system of claim 14 wherein the semantic reflective object recognition comprises determining whether detected objects are reflective objects more likely to have an undesired reflected object on a surface of the reflective object, and wherein the another detected object is limited to detected objects determined to be reflective objects.

16. The system of claim 15 where the semantic reflective object recognition comprises comparing the detected objects to predetermined reflective objects listed in a reflective object database.

17. At least one non-transitory computer-readable medium having stored thereon instructions that when executed cause a computing device to operate by:

obtaining at least one image of a scene captured by a camera;

performing semantic reflective object recognition to detect at least one reflective object in the image by searching the image for multiple different reflective objects rather than non-reflective objects wherein the reflective objects each have a different semantic label in a list of multiple semantic reflective object labels, and wherein the searching comprising using 3D positions of the detected objects to make a determination as to whether a detected object is an undesired reflected object;

performing semantic reflected object recognition comprising searching only on the reflective objects on the image rather than searching the entire image to detect at least one undesired reflected object on the at least one reflective object and wherein the reflected object is a reflection in the image of at least part of an original object that was not visible to the camera while capturing the scene, and wherein the reflected object has a semantic label in a list of semantic reflected object labels; and automatically blurring the at least one detected undesired reflected object in the image when the undesired reflected object is found to be at least partially disposed on at least one of the reflective objects.

18. The medium of claim 17 wherein the searching comprises performing a semantic comparison to determine whether a detected object matches at least one undesired object listed in a database of undesired objects.

19. The medium of claim 17 wherein the searching comprises comparing the size and 3D position of reflective objects to potentially undesired reflected objects to determine whether a detected object is an undesired reflected object.

20. The medium of claim 17 wherein the searching comprises using a semantic scene understanding of the image to label a first detected object an undesired reflected object when the first detected object is on another detected object when it does not make sense for the first detected object to be on the another detected object.

21. The medium of claim 20 wherein the semantic reflective object recognition comprises determining whether detected objects are reflective objects more likely to have an undesired reflected object on a surface of the reflective object, and wherein the another detected object is limited to detected objects determined to be reflective objects.

* * * * *